US 6,654,086 B2

(12) United States Patent
Nakasima

(10) Patent No.: US 6,654,086 B2
(45) Date of Patent: Nov. 25, 2003

(54) REFLECTION-TYPE LIQUID CRYSTAL DISPLAY APPARATUS COMPRISING A LIGHT INTERFERENCE REFLECTOR AND MANUFACTURING METHOD OF THE SAME

(75) Inventor: Hiroshi Nakasima, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 09/725,968

(22) Filed: Nov. 29, 2000

(65) Prior Publication Data

US 2001/0006406 A1 Jul. 5, 2001

(30) Foreign Application Priority Data

Jan. 4, 2000 (JP) ........................................ 2000-000068

(51) Int. Cl.[7] ............................................. G02F 1/1335
(52) U.S. Cl. ........................ 349/113; 349/105; 349/160
(58) Field of Search ................................. 349/105, 107, 349/17, 160, 201, 113

(56) References Cited

U.S. PATENT DOCUMENTS

| 4,006,968 A | * | 2/1977 | Ernstoff et al. ............. 349/105 |
| 4,251,137 A | * | 2/1981 | Knop et al. ............. 350/347 V |
| 4,773,718 A | * | 9/1988 | Weitzen et al. ............. 350/3.61 |
| 4,867,537 A | * | 9/1989 | Aoki et al. .................. 349/111 |
| 4,913,504 A | * | 4/1990 | Gallagher .................... 350/3.6 |

OTHER PUBLICATIONS

Cowan, "Aztec surface–relief volume diffractive structure", J. Opt. Soc. Am. A, vol. 7, No. 8, pp. 1529–1544, (1990).*

* cited by examiner

Primary Examiner—Robert H. Kim
Assistant Examiner—Andrew Schechter
(74) Attorney, Agent, or Firm—Robert M. Trepp; Nathaniel T. Wallace

(57) ABSTRACT

A reflection-type liquid crystal display apparatus capable of securing sufficient brightness, gray scale display and reducing color changes with a viewing angle, and a cost-effective manufacturing method of the same.

As a reflector, a light interference reflector having preferably a grating structure for selectively reflecting light only in a particular wavelength range by using light interference is used, incident light is selectively reflected by the light interference reflector, and reflected light having only wavelengths of R, G and B is individually made incident on respective pixel portions of R, G and B. The light interference reflector performs the function of a color filter. Thus, a reflection-type liquid crystal display apparatus is provided, which is capable of securing sufficient brightness without using any color filters, in addition to providing gray scale display and reducing color changes with a viewing angle.

6 Claims, 9 Drawing Sheets

REFLECTION-TYPE LIQUID CRYSTAL DISPLAY APPARATUS COMPRISING A LIGHT INTERFERENCE REFLECTOR AND MANUFACTURING METHOD OF THE SAME

BACKGROUND OF THE INVENTION

1. Technical Field

The present invention relates generally to a reflection-type liquid crystal display apparatus capable of full-color display. Particularly, the present invention relates to a reflection-type liquid crystal display apparatus capable of full-color display without using any color filters, and to a manufacturing method thereof.

2. Description of Related Art

As for a reflection-type liquid crystal display apparatus capable of full-color display, various structures are well known. FIG. 10 shows an example of a reflection-type liquid crystal full-color display apparatus. In the example shown in FIG. 10, a conventional reflection-type liquid crystal display apparatus 51 is constructed by disposing a color filter 53 adapted to let only light of any one of R, G and B pass through a pixel portion, a transparent electrode 54 made of ITO or the like, a liquid crystal 55, and a metal electrode 56 to be used as a reflector, which are provided in this order from the upper side in the drawing between two glass substrate, the upper 52-1 and the lower 52-2. In an actual case, in addition to the elements shown in FIG. 10, a polarizer, a spacer and the like are included. But such elements are omitted in the description because of no direct relation to the present invention.

In the case of the foregoing conventional reflection-type liquid crystal display apparatus, light passes through the color filter 53 twice, i.e., at the time of coming in and going out. Assuming that the incident light intensity is Iin; outgoing light intensity is Iout; transmissivity of the color filter is 53 $T_c$; the intensity of the reflector is $R_M$; and a constant for others is k, then the relation of these is expressed as follows:

$$Iout=kT_c^2 R_M Iin \quad (1)$$

Since the light transmissivity $T_c$ of the single color filter 53 is low, a great reduction occurs in brightness of the reflection-type liquid crystal display apparatus. Therefore, in the foregoing conventional reflection-type liquid crystal display apparatus, the quantity of light that results is inadequate, making it impossible to have full-color display with sufficient brightness.

In order to solve the foregoing problem, a reflection-type liquid crystal apparatus using a color filter of two colors has been presented. This apparatus uses, as a color filter, not three primary colors of R, G and B but two colors of purplish red (=red (R)+blue (B)), and green (G). The use of the two colors instead of the three primary colors enables a transmission spectrum of the color filter to be widened, which can provide better brightness. However, the use of the two colors instead of the three primary colors makes it impossible to produce a full-color display. In addition, because of the use of the color filters, although only the two colors are used, the problem of a reduction in brightness still remains to be solved.

As a method of using no color filters, a reflection-type liquid crystal display apparatus of an ECB system has been presented. This apparatus is a system adapted to display colors by changing a voltage applied to a liquid crystal layer to cause a change in the inclination of liquid crystal molecules, and detecting a resulting change in the birefringence of the liquid crystal layer by a pair of polarizers. In other words, since the wavelength of a reflected light is controlled by an applied voltage, the necessity of a color filter is eliminated for providing better brightness. With this system, however, only spectral light is emitted, and the range of control by a voltage is narrow. Thus, only five colors of white, black, blue, green and red can be expressed.

Japanese Patent Laid-Open No. 7-175079 discloses a liquid crystal display apparatus, which includes a reflective liquid crystal layer adapted to reflect only a circular polarized light in the particular direction of a specified wavelength through cholesteric liquid crystal. Accordingly, it is possible to provide a liquid crystal display having high light utilization efficiency and being capable of vivid display without using any color filters or polarizers. However, there have been problems including the inability to produce a gray scale display and a drastic color change with a viewing angle. Consequently, the foregoing liquid crystal display has been used only as a fixed device.

Further, Japanese Patent Laid-Open No. 7-175079 discloses a reflection-type color filter having a multilayer interference film made of a dielectric multilayer film, and a liquid crystal display using the same. Accordingly, it is possible to provide a reflection-type color liquid crystal display capable of display with brightness sufficient for a practical purpose without using any reflectors or color filters. However, there have been problems including much time and labor for manufacturing the multilayer interference film made of a dielectric multilayer film, and the difficulty of realizing the color liquid display because of costs.

SUMMARY OF THE INVENTION

An object of the present invention is to solve the foregoing problems. An object of the present invention is to provide a simply manufactured reflection-type liquid crystal display apparatus capable of securing sufficient brightness because of no use of color filters, also capable of gray scale display and reducing color changes with a viewing angle, and a manufacturing method of the same.

The invention provides a reflection-type liquid crystal display apparatus capable of full-color display. This reflection-type liquid crystal display apparatus comprises a light interference reflector preferably having a grating structure and adapted as a reflector to selectively reflect light only in a particular wavelength range by using light interference. In this case, the light interference reflector is used, the light interference reflector selects incident light, and the reflected light made of only light of receptible wavelength range of R, G and B are respective pixel portions of R, G and B. According to the present invention, the light interference reflector performs the function of a color filter. Thus, it is possible to provide a reflection-type liquid crystal display apparatus capable of securing sufficient brightness, gray scale display and reducing color changes with a viewing angle without using any color filters.

Furthermore, the present invention provides a manufacturing method of a reflection-type liquid crystal display apparatus using a light interference reflector having a grating structure. This method comprises the step of forming a grating structure of a light interference reflector by means of patterning performed by pressing a die on a surface of a metal substrate. Accordingly, one light interference reflector can be formed only by one patterning step performed by pressing the die on the surface of the metal substrate once. Therefore, the light interference reflector, that is to say the reflection-type liquid crystal display apparatus, can be manufactured easily.

These and other aspects, features and advantages of the present invention will be described or become apparent from the following detailed description, which is to be read in connection with the accompanying drawings.

BRIEF DESCRIPTION OF THE DRAWINGS

For more complete understanding of the present invention and the advantages thereof, reference is now made to the following description taken in conjunction with the accompanying drawings.

DETAILED DESCRIPTION OF PREFERRED EMBODIMENTS

Figure 1:
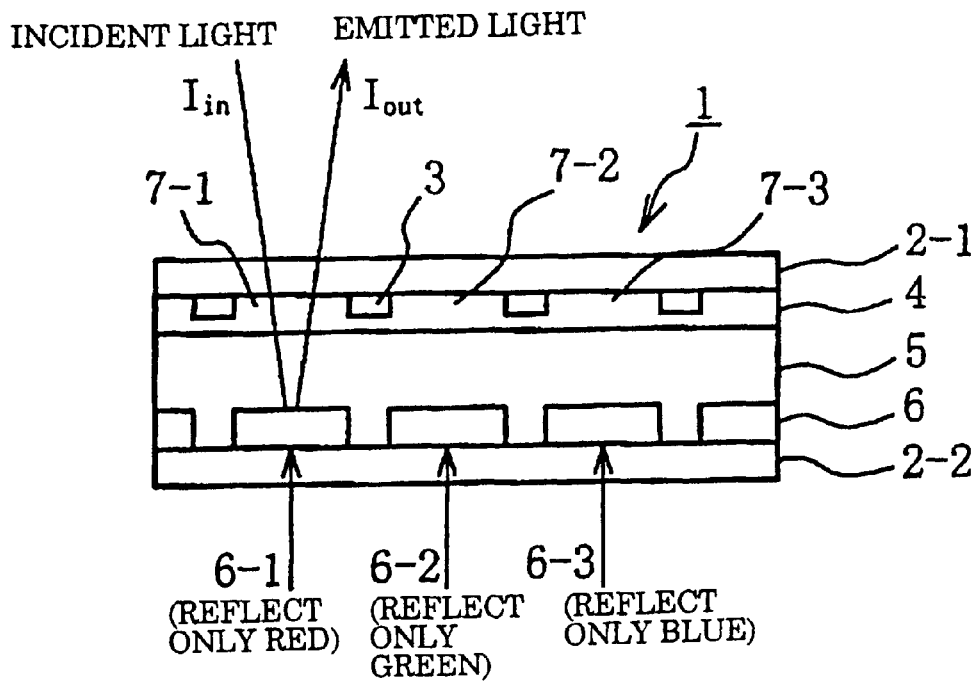
FIG. 1 is view showing a constitution of an example of a reflection-type liquid crystal display apparatus of the present invention.

FIG. 1 shows an example of a reflection-type liquid crystal display apparatus of the present invention. In the example shown in FIG. 1, a reflection-type liquid crystal display apparatus 1 of the present invention comprises: a mask 3 defining a pixel portion; a transparent electrode 4 made of a material such as ITO or the like; a liquid crystal 5; and a metal electrode 6 to be used as a reflector. These elements are disposed between two glass substrates, an upper 2-1 and a lower 2-2, in the above order from the upper side of the drawing.

A reflection-type liquid crystal display apparatus having the foregoing constitution includes the following features: no use of color filters; and use of light interference reflectors 6-1, 6-2 and 6-3 for selectively reflecting light only in a particular wavelength range by utilizing light interference, which are provided to form a metal electrode 6 to be used as a reflector. For example, in the example shown in FIG. 1, the reflector (metal electrode) 6 is formed by arraying the light interference reflector 6-1 for reflecting only red (R) color, the light interference reflector 6-2 for reflecting only green (G) color, and the light interference reflector 6-3 for reflecting only blue (B) color in this order corresponding to pixel portions. In the example, each of the light interference reflectors also operates as a metal electrode. Needless to say, however, the light interference reflector and the metal electrode may be separately provided. It should also be understood that similar constituting members to those in the conventional case, other than the color filter, can be used. Moreover, in an actual case, in addition to the elements shown in FIG. 1, other elements including a polarizer, a spacer and the like are provided. But these members are omitted because of no direct relation to the invention.

In the reflection-type liquid crystal display apparatus 1 of the present invention having the foregoing constitution, incident light is transmitted through the upper glass substrate 2-1, the transparent electrode 4 and the liquid crystal 5 to enter the light interference reflectors 6-1, 6-2 and 6-3. Reflected light having particular colors reflected by the light interference reflectors 6-1, 6-2 and 6-3 is emitted from the liquid crystal display apparatus 1 through the liquid crystal 5, the transparent electrode 4 and the glass substrate 2-1. Specifically, in the example shown in FIG. 1, assuming that pixel portions defined by the masks 3 are 7-1, 7-2 and 7-3, reflected light of red color reflected by the light interference reflector 6-1 for reflecting only red color is emitted as a light of red color through the pixel portion 7-1, reflected light of green color reflected by the light interference reflector 6-2 for reflecting only green color is emitted as light of green color through the pixel portion 7-2, and reflected light of blue color reflected by the light interference reflector 6-3 for reflecting only blue color is emitted as light of blue color through the pixel portion 7-3. Accordingly, full-color display can be performed in the reflection-type liquid crystal display apparatus 1 of the present invention.

As described above, the reflection-type liquid crystal display apparatus 1 of the present invention not only enables full-color display to be performed as in the conventional case, but also advantageously provides brighter display without any attenuation of incident and reflected light, which is realized without use of color filters. Specifically, the emitted light intensity Iout in the expression (1) given for the conventional reflection-type liquid crystal display apparatus 51 can be represented by the following expression (2):

$$Iout = kR_M Iin \qquad (2)$$

Accordingly, the following is obtained:

$$Iout(\text{invention})/Iout(\text{conventional}) = 1/T_c^2 \qquad (3)$$

It can be understood that the emitted light intensity from the reflection-type liquid crystal display apparatus 1 of the present invention is larger by $1/T_c^2$ than that of the conventional case. As is known, since light attenuation is large in the color filter, a value of $1/T_c^2$ is also large, and thus an advantage of the reflection-type liquid crystal display apparatus 1 of the present invention is apparent.

Figure 2:
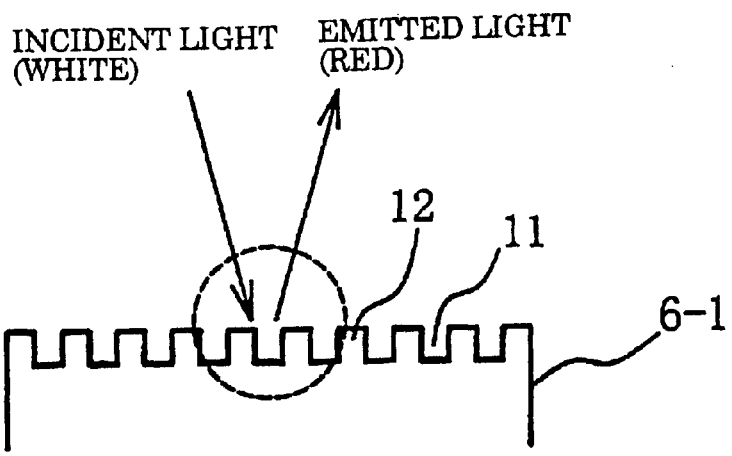
FIG. 2 is an enlarged view showing an example of a light interference reflector of the reflection-type liquid crystal display apparatus of the present invention.

Next, descriptions will be made for the light interference reflector 6-1 (6-2, or 6-3) of the foregoing reflection-type liquid crystal display apparatus 1 of the present invention. FIG. 2 is an enlarged view showing an example of the light interference reflector 6-1 of the reflection-type liquid crystal display apparatus 1 of the present invention. In the example shown in FIG. 2, the interference reflector 6-1 has a grating structure on a portion corresponding to one of pixel portions of R, G and B, i.e., the entire upper surface of the light interference reflector 6-1 being composed of concave and convex portions 11 and 12 has the grating structure. The grating structure comprised of the concave and convex portions 11 and 12 are provided on the surface of the light interference reflector 6-1 made of metal. By forming the grating structure comprised of the concave and convex portions 11 and 12 on the surface of the light interference reflector 6-1 made of metal, and controlling the height of the steps defined by the concave and convex portions 11 and 12, it is possible to selectively reflect only each of wavelength ranges of each of colors R, G and B for each pixel. As an example, regarding a perpendicular incident light, the height of the step is set equal to 310 nm to selectively reflect red color light (620 nm), the height of the step is set equal to 275 nm to selectively reflect green color light (550 nm), and the height of the step is set equal to 225 nm to selectively reflect blue color light (450 nm).

Figure 3:
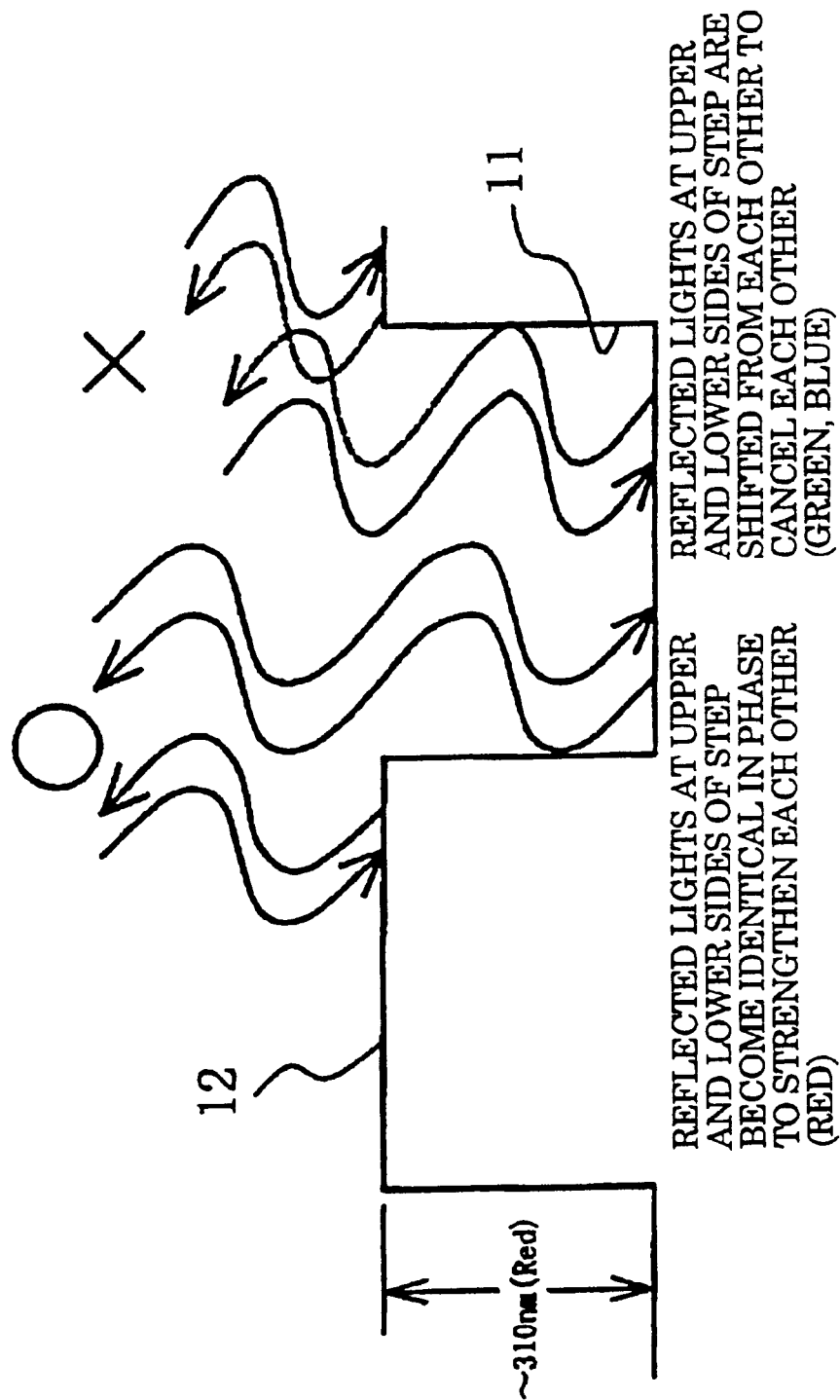
FIG. 3 is a concept view illustrating an exemplary reason why selective light reflection by interference occurs in the light interference reflector of FIG. 2.

FIG. 3 is a concept view illustrating an exemplary reason why selective light reflection occurs by interference in the light interference reflector described above with reference to FIG. 2. FIG. 3 illustrates where in the light interference reflector 6-1, the height of the step is set equal to 310 nm in order to selectively reflect red color. In FIG. 3, as indicated by a ○ mark, the reflected red color light at the lower and upper sides of the step defined by the concave and convex portions 11 and 12, become identical in phase to strengthen each other. On the other hand, regarding green and blue light, as indicated by a x mark, the reflected light at the lower and upper sides of the step defined by the concave and convex portions 11 and 12 are shifted from each other in phase so as to cancel each other. Accordingly, selective light reflection by interference occurs in the light interference reflector of the grating structure.

Figure 4:
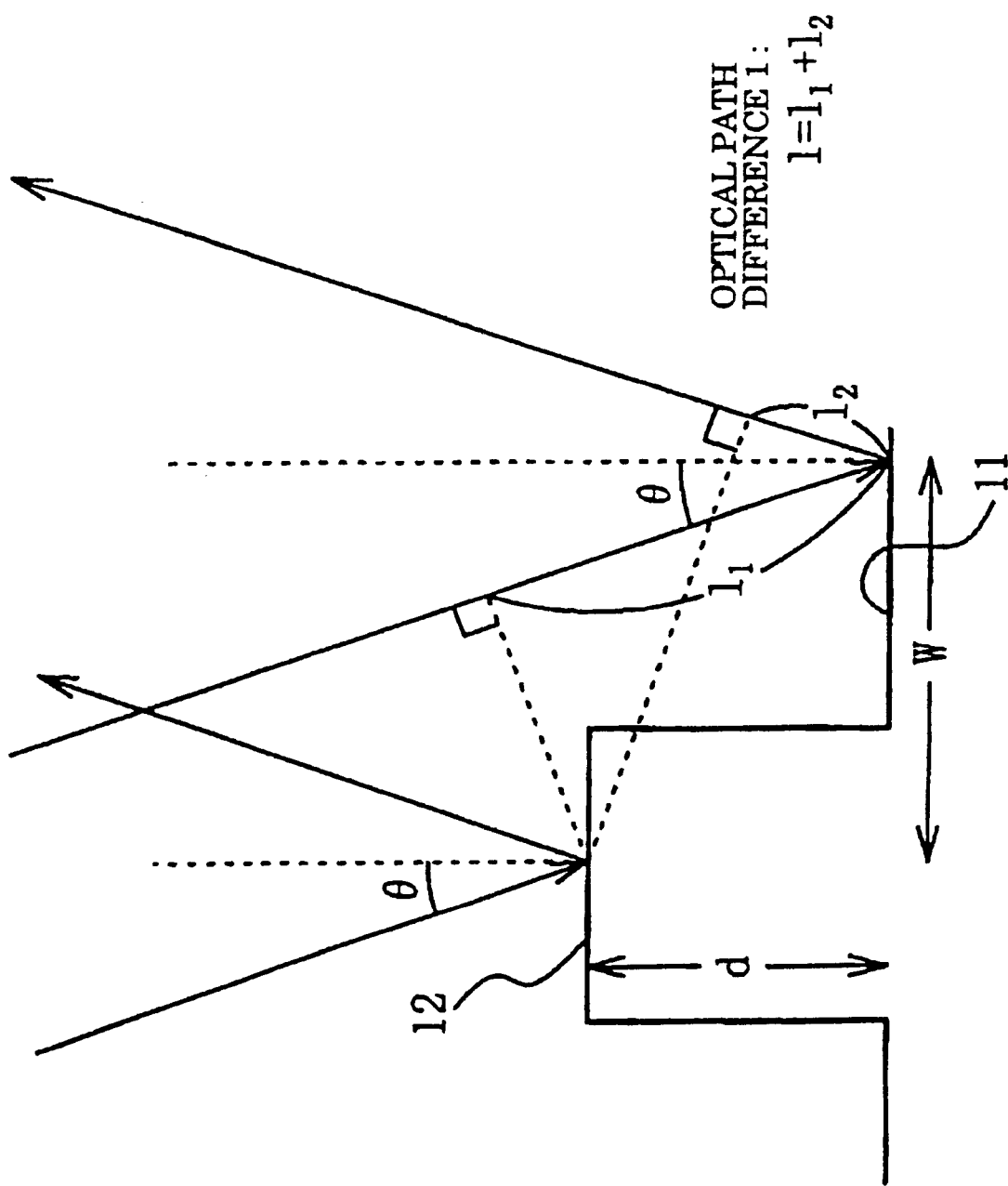
FIG. 4 is a view illustrating in more detail the concept of selective light reflection by interference.

Next, detailed descriptions will be made for a concept of the foregoing selective light reflection by interference with reference to FIGS. 4 to 6. First, as shown in FIG. 4, two incident light rays enter at angle θ with axes perpendicular to the surface of the light interference reflector. One of the light rays is reflected on the convex surface of the convex portion 12, and the other is reflected on the bottom surface of the concave portion 11. It is assumed herein that the height of the step defined by the concave and convex portions 11 and 12 is d, and the distance between the incident position of the surface of the convex portion 12 for the entry of one incident light and the incident position of the bottom surface of the concave portion 11 for the entry of the other incident light, along the surface of the light interference reflector is w. In the example shown in FIG. 4, an optical path difference l between one incident light and the other incident light is $l=l_1+l_2$.

Figure 5:
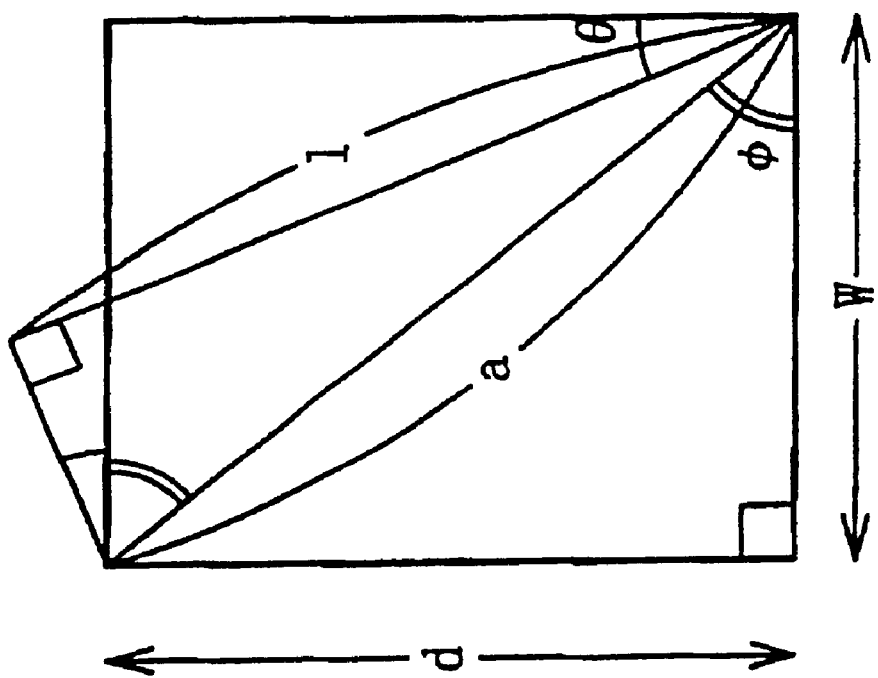
FIG. 5 is a view illustrating in more detail the concept of selective light reflection by interference as in the case of FIG. 4.

Hereupon, as shown in FIG. 5, assuming that a line (length a) connecting the incident positions at the bottom surface of the concave portion 11 and at the upper surface of the convex portion 12 for the entries of two incident light, and the surface of the light interference reflector make an angle θ, an optical path different $l_1$ can be expressed as follows:

$$l_1 = a\sin(\phi+\theta) = (d^2+w^2)^{1/2} \sin(\phi+\theta)$$

Figure 6:
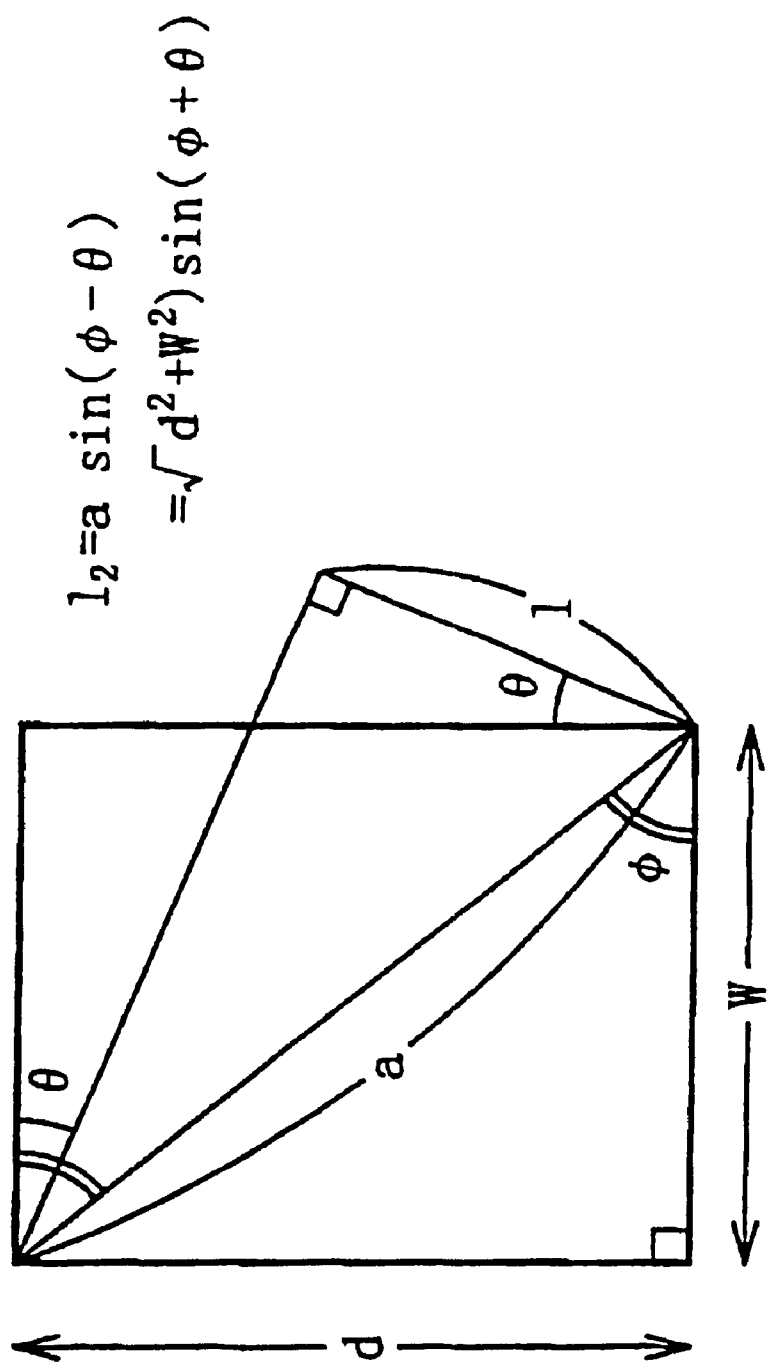
FIG. 6 is a view illustrating in more detail the concept of selective light reflection by interference as in the case of FIG. 4.

Similarly, as shown in FIG. 6, an optical path difference $l_2$ can be expressed as follows:

$$l_2 = a\sin(\phi-\theta) = (d^2+w^2)^{1/2} \sin(\phi-\theta)$$

Accordingly, an optical path difference l can be expressed as follows:

$$l = l_1+l_2 = a\{\sin(\phi+\theta)+\sin(\phi-\theta)\} = 2a\sin\Phi\cos\theta = 2a(d/a)\cos\theta = 2d\cos\theta$$

Therefore, for example, to reflect only light having a wavelength of 650 nm at θ=0 (perpendicular case), the following is established:

$$d = 650/2 = 325 \text{ nm}$$

Figure 7:
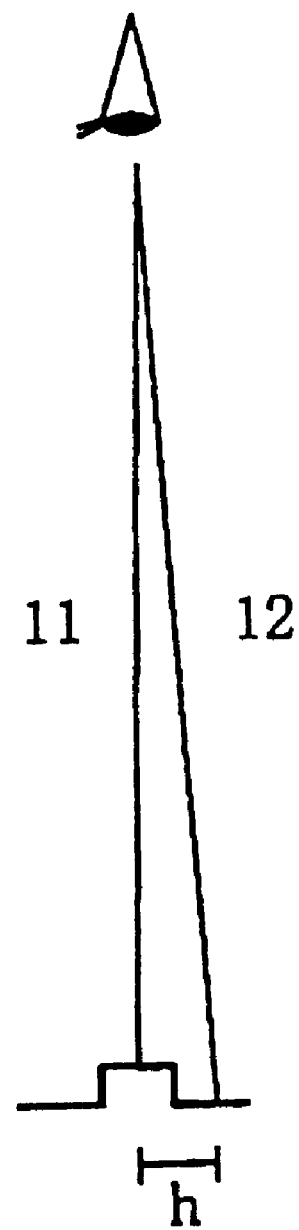
FIG. 7 is a view showing an exemplary condition when the reflection-type liquid crystal display apparatus of the present invention is used.

Considering the condition of an actual use of the foregoing reflection-type liquid crystal display apparatus 1 of the present invention, as shown in FIG. 7, light interference occurs when an optical path difference between light 11 and 12 entering a viewing point satisfies an interference condition. Thus, a path difference between two lights has no relation to light interference.

In the present example, since the light 11 and 12 are approximately 30 cm while h (w in the foregoing example) is about 300 nm in the example shown in FIG. 7, calculation of an interference condition can be made assuming that the light 11 and 12 are parallel to each other without any problem. Further, the foregoing height d of the step of the light interference reflector varies depending on an angle θ, which is between the incident light and the surface of the light interference reflector. Accordingly, when the height d of the step of the light interference reflector is actually designed corresponding to R, G and B, the angle which should be used as a reference is not clear. In this regard, according to the present invention, considering that for most instances a viewing point is located right in front of the reflection-type liquid crystal display apparatus 1, i.e., the angle is θ=0, d is calculated in the case of θ=0 for use. In this case, a viewing angle characteristic (that is, no change occurs in a wavelength of a visible light or color even if an angle is changed) is a problem. However, for the use of the reflection-type liquid crystal display apparatus 1 of the present invention, it has been verified that a viewing angle characteristic is not deteriorated even if the viewing angle changes by ±30 degrees.

Figure 8:
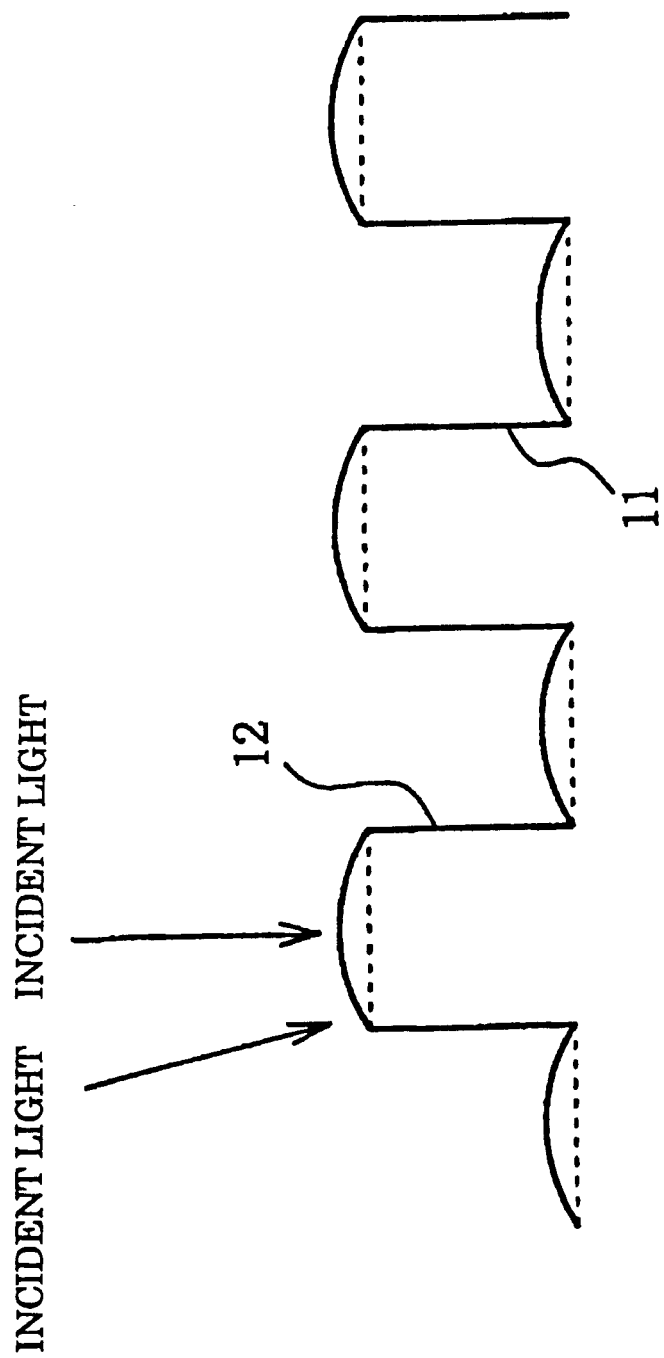
FIG. 8 is a view showing a constitution of another example of a light interference reflector used for the reflection-type liquid crystal display apparatus of the present invention.

FIG. 8 shows the constitution of another example of a light interference reflector used for the reflection-type liquid crystal display apparatus of the present invention. In the example shown in FIG. 8, the bottom surface of the concave portion 11 and the convex surface of the convex portion 12, respectively having grating structures, are formed in circular arc shapes protruding outward. In this example, viewing angle characteristics improve as compared with the foregoing embodiment in which the bottom surface of the concave portion 11 and the convex surface of the convex portion 12, respectively having the grating structures, have all flat surfaces.

Figure 9:
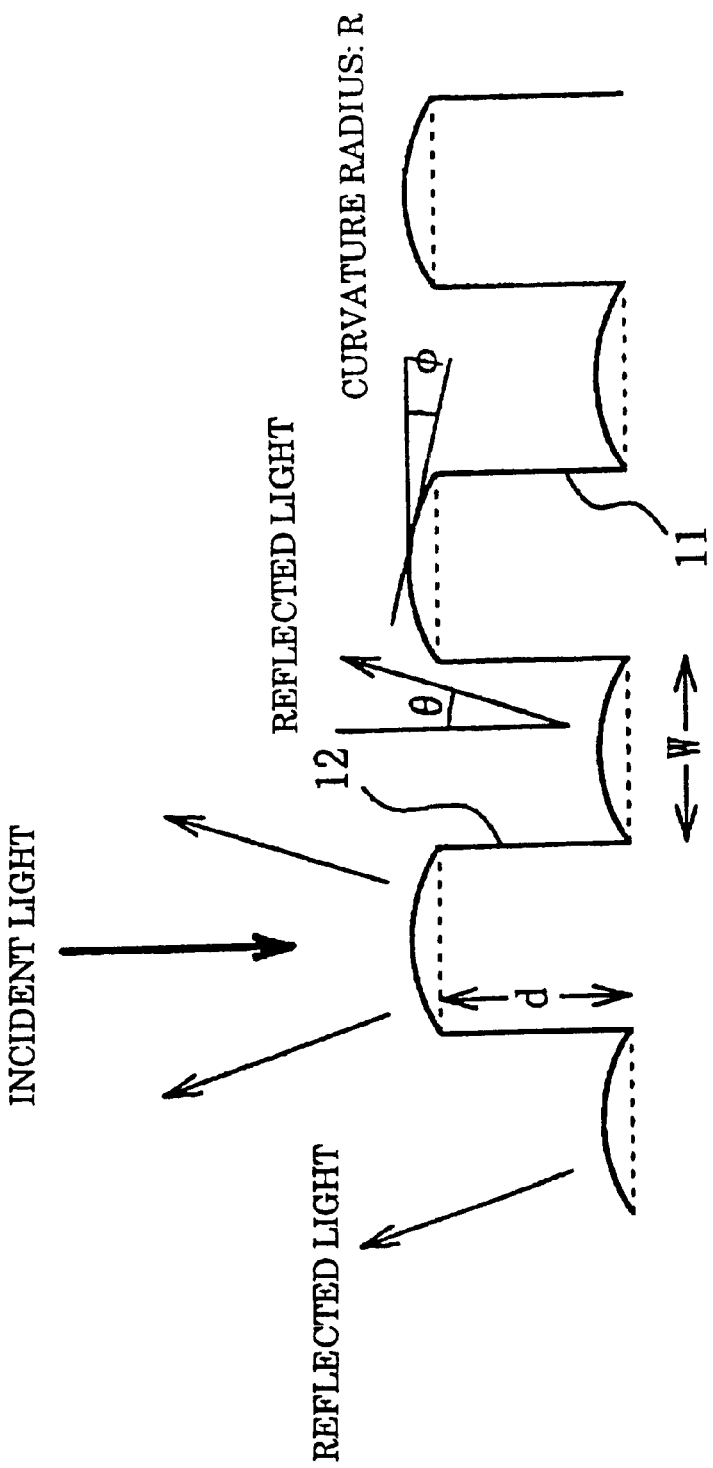
FIG. 9 is a view illustrating an exemplary reason why a better viewing angle characteristic can be provided in the example shown in FIG. 8.
Figure 10:
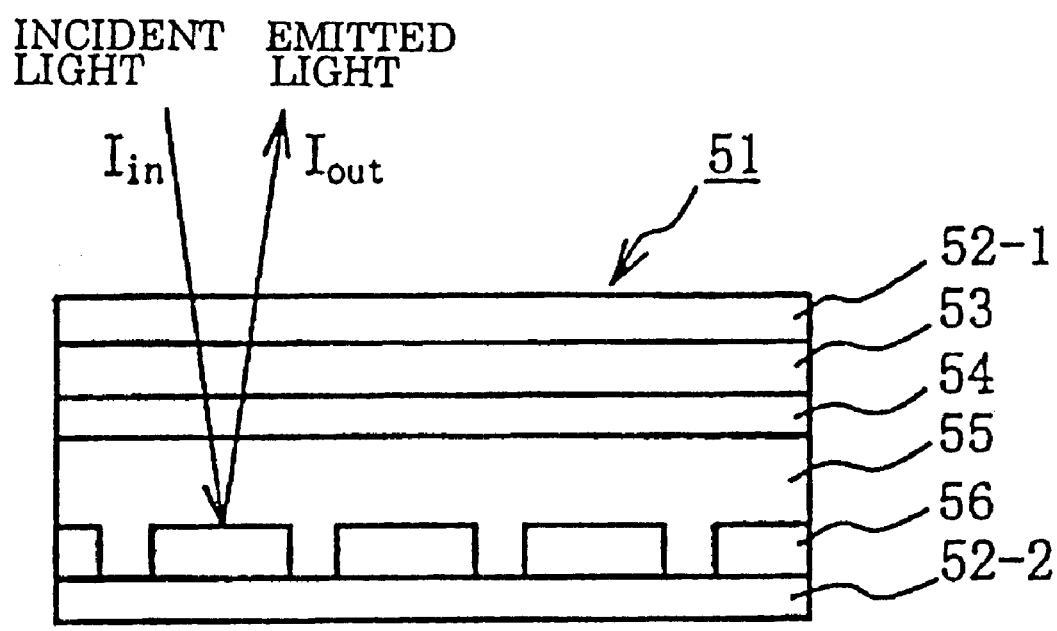
FIG. 10 is a view showing a constitution of an example of a conventional reflection-type liquid crystal display apparatus.

FIG. 9 is a view illustrating a reason why a better viewing angle characteristic can be provided in the example of FIG. 8. As shown in FIG. 9, consideration is now given to a case where a grating surface having a depth d and a width w is a circular arc with a curvature radius R. Assuming that an angle between incident light made incident perpendicularly to the reflector and a reflected light in this case is θ, this angle θ varies depending on a reflection position on the grating surface, and its value is expressed as follows:

$$\theta = 2\psi$$

ψ is an angle between the grating surface and a surface parallel to the reflector, and can be expressed as follows:

$$\psi = A\sin(w/(2R))$$

Considering red color light having a wavelength of 650 nm, the following is established:

$$d = w = 650 \text{ (nm)}$$

Thus, for example, if a curvature radius R is as follows:

$$R = 620 \text{ (nm)}$$

then, the following is established:

$$\theta = 2\psi \text{ to } 30 \text{ [deg]}$$

Reflected light is widened in the range of 0 to ±30 degrees with respect to the incident light perpendicularly to the reflector. From such a result, it can be understood that the circular-arc formation of the grating surface improves viewing angle characteristic.

Next, descriptions will be made for a manufacturing method of the reflection-type liquid crystal display apparatus according to an aspect of the present invention. The manufacturing method of the reflection-type liquid crystal display apparatus of the present invention is basically similar to that of the conventional reflection-type liquid crystal display apparatus, but excludes a color filter and involves use of a light interference reflector having the foregoing constitution as a reflector. Thus, the like manufacturing steps are omitted. With the present invention, it is not necessary to incorporate any color filters, but as shown in FIG. 1, the mask 3 must be provided to define a pixel portion between the glass substrate 2-1 and the transparent electrode 4. Accordingly, a mask manufactured by removing a color striped layer of R, G and B from the color filter layer used in the conventional reflection-type liquid crystal display apparatus, is preferably provided between the glass substrate 2-1 and the transparent electrode 4. In addition, for the light interference reflector, especially for one having a grating structure, its grating structure can be formed by pressing a die on the surface of a metal substrate and patterning. Three kinds of dies having different step heights must be prepared corresponding to individual colors of R, G and B. Once the dies are prepared, the light interference reflector having the grating structure can be obtained in simple steps, and thus this method is suitably used as a technology for mass production of reflection-type liquid crystal display apparatus.

As apparent from the foregoing, according to the present invention, since the light interference reflector performs the function of the color filter, the reflection-type liquid crystal display apparatus manufactured by a simple process can secure sufficient brightness without using any color filters, and can perform gray scale display, and also reduce color changes caused by the viewing angle.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A reflection-type liquid crystal display apparatus capable of color display, comprising:

a light interference reflector adapted to selectively reflect light in a particular wavelength range by using light interference, wherein the light interference reflector selectively reflects incident light, and the selectively reflected light in the wavelength range of R, G and B enters into respective pixel portions of R, G and B, wherein each of the portions of the light interference reflector corresponding to the pixel portions of R, G and B has a grating structure comprised of concave and convex portions, and wherein each bottom surface of the concave portion and each surface of the convex portion comprising the grating structure have a curvature protruding in a circular-arc shape for improving a viewing angle of the liquid crystal display apparatus.

2. The reflection-type liquid crystal display apparatus according to claim 1, wherein each portion of the grating structure corresponding to each of the pixel portions of R, G and B reflects only respective light wavelength range or R, G and B by controlling the height of steps defined by the concave and convex portions.

3. The reflection-type liquid crystal display apparatus according to claim 1, wherein each of the portions of the light interference reflector corresponding to each pixel portions of R, G and B is a metal electrode.

4. A manufacturing method of the reflection-type liquid crystal display apparatus of claim 1, comprising the step of:

forming a patterned grating structure by pressing a die on a surface of a metal substrate.

5. The reflection-type liquid crystal display apparatus capable of color display of claim 1, further comprising:

a mask provided between a glass substrate and a transparent electrode for defining each pixel portion; and a liquid crystal material deposited between the light interference reflector and the transparent electrode.

6. The reflection-type liquid crystal display apparatus capable of color display of claim 5, wherein the incident light passes through the glass substrate, transparent electrode, and liquid crystal material before striking the light interference reflector.

* * * * *